(12) United States Patent
Annampedu et al.

(10) Patent No.: US 7,813,065 B2
(45) Date of Patent: Oct. 12, 2010

(54) SYSTEMS AND METHODS FOR ACQUIRING MODIFIED RATE BURST DEMODULATION IN SERVO SYSTEMS

(75) Inventors: Viswanath Annampedu, Schnecksville, PA (US); Venkatram Muddhasani, Bethlehem, PA (US); Xun Zhang, Lowell, MA (US)

(73) Assignee: Agere Systems Inc., Allentown, PA (US)

( * ) Notice: Subject to any disclaimer, the term of this patent is extended or adjusted under 35 U.S.C. 154(b) by 235 days.

(21) Appl. No.: 12/111,319

(22) Filed: Apr. 29, 2008

(65) Prior Publication Data

US 2009/0268322 A1   Oct. 29, 2009

(51) Int. Cl.
G11B 20/08 (2006.01)
G11B 5/596 (2006.01)
(52) U.S. Cl. ...................... 360/29; 360/77.08
(58) Field of Classification Search ............. 360/29, 360/39, 75, 77.08
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,521,948 A | 5/1996 | Takeuchi | |
| 5,523,902 A | 6/1996 | Pederson | |
| 5,696,639 A | 12/1997 | Spurbeck et al. | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner*—Daniell L. Negron
*Assistant Examiner*—Regina N Holder
(74) *Attorney, Agent, or Firm*—Hamilton, DeSanctis & Cha

(57) ABSTRACT

Various embodiments of the present invention provide systems and methods for performing modified rate burst demodulation. For example, a method for performing modified rate burst demodulation is disclosed. The method includes receiving a data input that includes a synchronization pattern, an information pattern, and a demodulation pattern. A periodic boundary is established along with a phase and frequency of a sampling clock based at least in part on the synchronization pattern. The information pattern is processed using the sampling clock to determine a location fix. The sampling clock is phase shifted by a skew amount and a phase shifted sampling clock is provided. The demodulation pattern is processed using the phase shifted sampling clock.

20 Claims, 6 Drawing Sheets

U.S. PATENT DOCUMENTS

| | | | |
|---|---|---|---|
| 6,069,583 | A | 5/2000 | Silvestrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,278,591 | B1 | 8/2001 | Chang et al. |
| 6,441,661 | B1 | 8/2002 | Aoki et al. |
| 6,490,110 | B2 | 12/2002 | Reed et al. |
| 6,493,162 | B1 | 12/2002 | Fredrickson |
| 6,519,102 | B1 | 2/2003 | Smith |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,646,822 | B1 | 11/2003 | Tuttle et al. |
| 6,657,802 | B1 | 12/2003 | Ashley et al. |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B2 | 11/2005 | Hayashi |
| 6,999,257 | B2 | 2/2006 | Takeo |
| 6,999,264 | B2 | 2/2006 | Ehrlich |
| 7,002,767 | B2 | 2/2006 | Annampedu et al. |
| 7,038,875 | B2 | 5/2006 | Lou et al. |
| 7,072,137 | B2 | 7/2006 | Chiba |
| 7,092,462 | B2 | 8/2006 | Annampedu et al. |
| 7,126,776 | B1 | 10/2006 | Warren, Jr. et al. |
| 7,136,250 | B1 | 11/2006 | Wu et al. |
| 7,420,498 | B2 | 11/2006 | Barrenscheen |
| 7,167,328 | B2 | 1/2007 | Annampedu et al. |
| 7,180,693 | B2 | 2/2007 | Anaampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,199,961 | B1 | 4/2007 | Wu et al. |
| 7,206,146 | B2 | 4/2007 | Flynn et al. |
| 7,253,984 | B1 | 8/2007 | Patapoutian et al. |
| 7,362,536 | B1 | 4/2008 | Liu et al. |
| 7,411,531 | B2 | 8/2008 | Aziz et al. |
| 7,423,827 | B2 | 9/2008 | Neville et al. |
| 7,446,690 | B2 | 11/2008 | Kao |
| 7,499,238 | B2 * | 3/2009 | Annampedu ............... 360/75 |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2003/0095350 | A1 | 5/2003 | Annampedu et al. |
| 2005/0157415 | A1 | 7/2005 | Chiang |
| 2005/0243455 | A1 | 11/2005 | Annampedu |
| 2007/0071152 | A1 | 3/2007 | Chen et al. |
| 2007/0183073 | A1 | 8/2007 | Sutardja et al. |
| 2007/0230015 | A1 | 10/2007 | Yamashita |
| 2008/0080082 | A1 | 4/2008 | Erden et al. |

OTHER PUBLICATIONS

.Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR ACQUIRING MODIFIED RATE BURST DEMODULATION IN SERVO SYSTEMS

BACKGROUND OF THE INVENTION

The present inventions are related to systems and methods for operating a servo system, and more particularly to system and methods for performing burst demodulation in a servo system.

A read channel integrated circuit (IC) is one of the core electronic components in a magnetic recording system such as a hard disk drive. A read channel converts and encodes data to enable magnetic read heads to write data to the disk drive and then read back the data accurately. The disks in a drive typically have many tracks on them. Each track typically consists of user data sectors, as well as control or "servo" data sectors embedded between the user sectors. The servo sectors help to position the magnetic recording head on a track so that the information stored in the read sectors is retrieved properly.

FIG. 1a depicts a data format of a servo data sector 100. As shown, servo data sector 100 may include a preamble pattern 102 which allows the system to recover the timing and gain of the written servo data. Preamble pattern 102 is typically followed by a servo address mark (SAM) 104 which is the same for all servo sectors. SAM 104 is then followed by encoded servo GRAY data 106, and GRAY data 106 is followed by one or more burst demodulation fields 108. GRAY data 106 may represent the track number/cylinder information and provides coarse positioning information for a read head traversing a magnetic storage medium. Burst demodulation field 108 provides fine positioning information for the read head traversing a magnetic storage medium. Burst demodulation field 108 typically includes sine waves written to a medium that can be used for retrieving head position information relative to the medium. Traditional systems use full rate demodulation where the frequency of the sine waves match that of preamble pattern 102. Thus, any timing acquisition done based on preamble pattern 102 may be applied to burst demodulation field 108. FIG. 1b shows the aforementioned servo data sector 100 incorporated as part of each of a number of tracks 160 each extending in a radial pattern around a radial magnetic storage medium 150. In an ideal case, a read head traverses an individual track over alternating servo data sectors and user data sectors.

When synchronizing to magnetic storage medium 150, data obtained using a read head traversing the medium is typically equalized to a desired target partial response by an equalizer configured as a continuous time filter (CTF) followed by a discrete-time finite impulse response (FIR) filter. In a synchronous system, the sampling of the CTF output signal uses timing information generated by a digital phase-locked loop (DPLL) locked to the symbol rate. The output samples of the equalizer are quantized to digital sample values ('Y' values) using an A/D converter (ADC). The 'Y' values are applied to a data detector (e.g., threshold detector or Viterbi detector). A SAM detector then searches for the SAM bit pattern in the detected data. Once SAM is detected, the GRAY code decoder decodes the data following the SAM data as GRAY data. The burst demodulation is timed with respect to the detected SAM data based on known lengths of the SAM and GRAY data. The detected SAM data thus serves as a reference for timing of the burst demodulation operation.

FIG. 2 depicts a prior art burst demodulation system 200 that may be used in relation to a servo system. An input signal 202 is received via an analog coupling stage 205, an automatic gain control circuit 210, and a continuous time filter 222. Input signal 202 intermittently includes servo data that is used to direct the sampling rate and sampling phase used for data within a given sector. A digital phase lock loop circuit 235 provides a clock output 237 that controls the points at which input signal 202 is sampled by an analog to digital converter 230. The phase and frequency of clock output 237 is adjusted based on an error signal provided by a phase/frequency detector 280. Phase frequency detector 280 generates the error and a slope based on the output from analog to digital converter 230. The error and slope signals from phase/frequency detector circuit 280 cause an adjustment to the phase and/or frequency of clock output 237, and continues to cause an adjustment until the error signal goes to zero.

In addition, the digital samples from analog to digital converter 230 are provided to a digital FIR filter 240 and to one or more digital interpolators 245. Digital interpolators 245 are operable to identify an incoming preamble signal and to determine the optimal phase/frequency for sampling the preamble. In particular, the processing of the preamble develops periodic boundaries (T) corresponding to the symbol rate defining the sampling times that are used in processing a subsequent SAM pattern and GRAY code pattern using a SAM detect and GRAY code detect circuit 255 to, among other things, identify the SAM incorporated in input signal 202. SAM detect and GRAY code detect circuit 255 provides a SAM found output signal 257 indicating that the SAM has been identified. A burst demod circuit 260 then seeks to identify the burst demodulation information incorporated in input signal 202.

In typical existing servo systems, processing a full rate burst demodulation pattern hinges only on proper assertion of the SAM found output signal. In particular, the burst demodulation information is found by counting a defined number of periodic boundaries (T) from SAM found output signal 257. FIG. 3 depicts such a situation where sampling to identify a SAM pattern 301 is indicated by vertical lines 303, 305 separated by four periodic boundaries (i.e., 4T). A SAM found output 307 is asserted coincident with sample 305. An intervening GRAY code 309 is decoded, followed by detection of a full rate burst demodulation pattern 311. The peak of a full rate burst demodulation pattern is an integer multiple (n) of periodic boundaries (T) (i.e., nT 313) from SAM found output 307. Of note, the sine of the sample is much greater than the cosine where the sample is taken near its peak. Such a situation results in a high signal to noise ratio.

This process of performing burst demodulation processing works very well where for full rate burst demodulation patterns as the peaks of the patterns occur an integer multiple of periodic boundaries from the SAM found signal. There are trends in the art, however, to use half rate demodulation patterns in place of the aforementioned full rate patterns. Such patterns offer a variety of advantages, but they do not typically align on periodic boundaries measurable from the SAM found signal. In some cases, while such half rate demodulation patterns offer some advantages, they can be difficult to detect and process.

Hence, for at least the aforementioned reasons, there exists a need in the art for advanced systems and methods for performing burst demodulation.

BRIEF SUMMARY OF THE INVENTION

The present inventions are related to systems and methods for operating a servo system, and more particularly to system and methods for performing burst demodulation in a servo system.

Various embodiments of the present invention provide hard disk drive systems. Such hard disk drive systems include a read channel device that includes a servo data processing circuit. The servo data processing circuit receives an analog input that includes servo data. The servo data includes a preamble pattern, a servo address mark pattern, a GRAY code pattern, and a burst rate demodulation pattern. The servo processing circuit includes an analog to digital converter that utilizes a sampling clock to provide a digital data input corresponding to the analog data input. A preamble pattern processing circuit receives at least the preamble pattern portion of the digital data input and is operable to establish a periodic boundary. The phase of the sampling clock at least indirectly corresponds to the established periodic boundary. A servo address mark processing circuit identifies a servo address mark found position. A clock generation circuit provides the sampling clock and is operable to phase shift the sampling clock by a skew amount. A burst mode demodulation processing circuit receives at least the burst rate demodulation pattern portion of the digital data input, and performs a modified rate burst mode demodulation using the phase shifted sampling clock. In one particular instance of the aforementioned embodiments, the phase shift by the skew amount is slowly implemented over the course of processing the GRAY code pattern. In various instances of the aforementioned embodiments, the periodic boundary recurs at a symbol rate, and the demodulation pattern is processed an integer number of periodic boundaries plus the skew amount after the location fix.

Other embodiments of the present invention provide methods for performing modified rate burst demodulation in a servo system. Such methods include receiving a data input that includes a synchronization pattern, an information pattern, and a demodulation pattern. A periodic boundary is established based at least in part on the synchronization pattern. A phase of a sampling clock used to receive the data input at least indirectly corresponds to the established periodic boundary. The information pattern is processed using the sampling clock to determine a location fix. The sampling clock is phase shifted by a skew amount and a phase shifted sampling clock is provided. The demodulation pattern is processed using the phase shifted sampling clock. In particular instances of the aforementioned embodiments, the modified rate burst demodulation pattern is a half rate burst demodulation pattern.

In some instances of the aforementioned embodiments, the data input includes servo data. In such instances, the synchronization pattern includes a preamble pattern of the servo data, the information pattern includes both a servo address mark pattern and a GRAY code pattern of the servo data, and the demodulation pattern is a modified rate burst demodulation pattern of the servo data. In some instances of the aforementioned embodiments, the location fix corresponds to the finding of the servo address mark within the servo address mark pattern. In various instances, the phase shift by the skew amount is slowly implemented over the course of processing the GRAY code pattern. In some cases, the skew amount is only partially implemented during processing of early portions of the GRAY code pattern, and the skew amount is fully implemented during processing of the final portions of the GRAY code pattern. The skew amount may be, but is not limited to, a user programmable skew amount or an automatically determined skew amount.

Yet other embodiments of the present invention provide servo systems. Such servo systems include an analog data input including a synchronization pattern, an information pattern, and a demodulation pattern. An analog to digital converter utilizes a sampling clock to provide a digital data input corresponding to the analog data input, and a synchronization pattern processing circuit receives at least a portion of the digital data input and is operable to establish a periodic boundary. A phase of the sampling clock at least indirectly corresponds to the established periodic boundary. An information pattern processing circuit is included that is operable to establish a position fix using the sampling clock. A clock generation circuit is included that is operable to provide the sampling clock, and to phase shift the sampling clock by a skew amount to provide a phase shifted sampling clock. A demodulation processing circuit operable to perform demodulation processing of the demodulation pattern using the phase shifted sampling clock.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components or to a non-specific one of the referenced elements.

DETAILED DESCRIPTION OF THE INVENTION

The present inventions are related to systems and methods for operating a servo system, and more particularly to system and methods for performing burst demodulation in a servo system.

Figure 4:
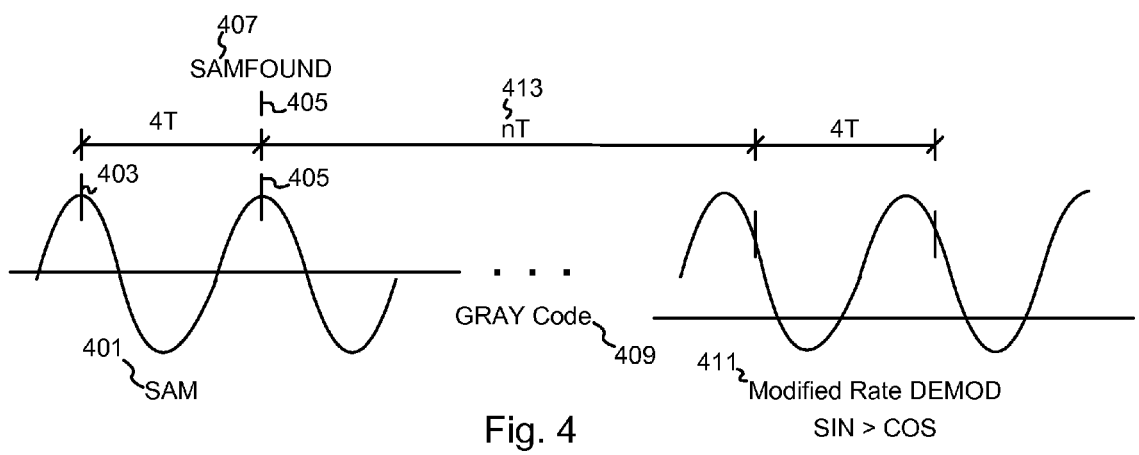
FIG. 4 depicts operation of an unmodified burst demodulation system operating on a modified rate demodulation.

As mentioned above, there is a trend in the industry to switch to half rate burst demodulation. In half rate burst demodulation, the frequency of the burst sine wave defining the burst demod pattern is only one half that of the sine wave defining the preceding preamble pattern. Thus, if an integer multiple of the periodic boundaries developed during processing of the preamble pattern is used, it may not provide sampling points where the sine of the sample is much greater than the cosine during processing of the burst mode demodulation. In such cases, the signal to noise ratio may be substantially less than that desired. FIG. 4 depicts such a scenario where sampling to identify a SAM pattern 401 is indicated by vertical lines 403, 405 separated by four periodic boundaries (i.e., 4T). A SAM found output 407 is asserted coincident with sample 305. An intervening GRAY code 409 is decoded, followed by detection of a modified rate burst demodulation pattern 411. The peak of modified rate burst demodulation pattern 411 is not necessarily an integer multiple (n) of periodic boundaries (T) (i.e., nT 413) from SAM found output 407. Such a situation may result in substantially degraded signal to noise ratios. Further, because traditional analog front-end phase response (e.g., read channel analog front end) is not a constant between the frequency of the preamble pattern and that of a half rate burst demodulation pattern, there always exists a phase mismatch between the sampling instants (i.e., periodic boundaries) of the preamble and those of the half rate burst demodulation pattern when the signals are processed through an analog front-end with a non-linear phase response.

Various embodiments of the present invention provide for processing modified rate burst demodulation patterns. As used herein, the phrase "modified rate" is used in its broadest sense to mean anything other than a full rate or some integer multiple of a full rate. Thus, as one example, a half rate burst demodulation is considered a modified rate burst demodulation. Such embodiments of the present invention provide for initializing burst demodulation an integer multiple of a periodic boundary established during processing of the preamble pattern offset by a skew factor (i.e., nT+Skew). The skew factor represents a phase shift of the clock that is a fraction of T. In some cases, the skew factor is user programmable. Thus, the user knowing which form of burst mode demodulation is selected as well as the characteristics of the analog front end can determine a desired skew factor and program that factor into a register that is used during servo processing. Alternatively, in other cases the skew factor may be automatically generated during, for example, a calibration period where the peaks of multiple burst mode demodulation patterns are timed from the SAM found signal to establish a desired skew. In some cases, the sampling clock is adjusted upon receiving the SAM found signal. In particular, the phase shift may be introduced slowly during GRAY code processing intervening between identification of the SAM boundary and the beginning of burst demodulation processing. This slewing of the phase shift allows for reasonable processing of the GRAY code pattern, but assures proper alignment with the subsequent burst demodulation pattern in time for processing that pattern. Thus, by the time the burst demodulation pattern is sampled, the sampling clock is correctly adjusted and properly samples the modified rate sinusoid with the correct phase.

Figure 5A:
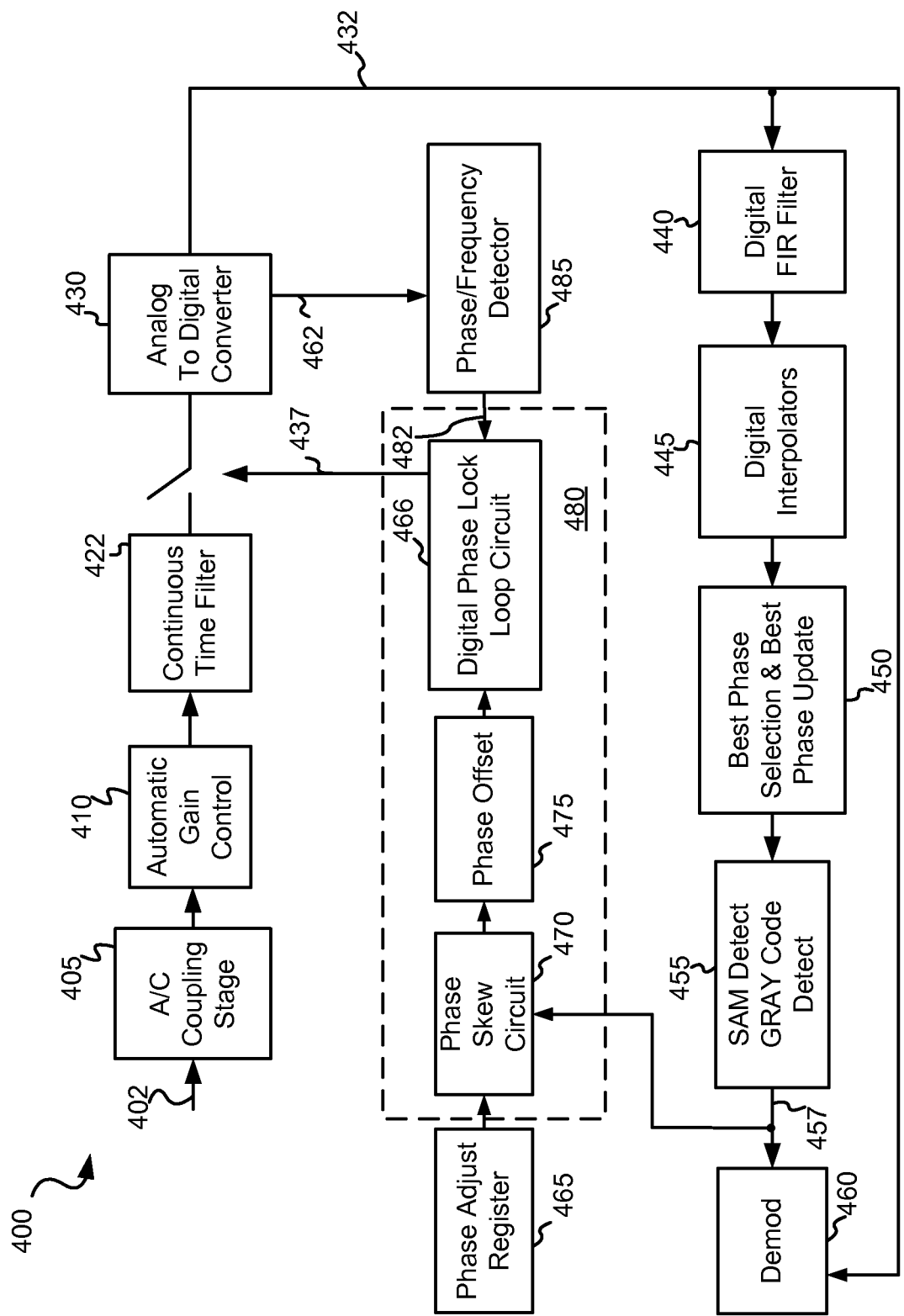
FIGS. 5a-5b shows a skew adjusted burst demodulation system in accordance with various embodiments of the present invention.

Turning to FIG. 5a, a skew adjusted burst demodulation system 400 is depicted in accordance with various embodiments of the present invention. Skew adjusted burst demodulation system 400 includes an input signal 402 that is received via an analog coupling stage 405, an automatic gain control circuit 410, and a continuous time filter 422. Analog coupling stage 405 is tailored for receiving input signal 402 and converting that signal to a usable analog electrical signal. In one particular embodiment of the present invention, skew adjusted burst demodulation system 400 is implemented as part of a hard disk drive including a magnetic storage medium. In such an embodiment, analog coupling stage 405 may be tailored for detecting a magnetic field from the magnetic storage medium, and for converting the magnetic field to an analog electrical signal. It should be noted that, depending upon the application, analog coupling stage 405 may be tailored for converting an RF signal or other signal type to an analog electrical signal. The analog electrical signal is provided to automatic gain control circuit 410 that operates to perform gain control on the analog electrical signal. Continuous time filter 422 receives the analog electrical signal from automatic gain control 410 and provides a filtered output. In a synchronous system, the sampling of the output signal from continuous time filter 422 uses timing information from a digitally controlled clock generator 480. It should be noted that other types of analog filters may be used in relation to different embodiments of the present invention. Based on the disclosure provided herein, one of ordinary skill in the art will recognize an appropriate analog filtering scheme that may be used in relation with different embodiments of the present invention.

The output from continuous time filter 422 is provided to an analog to digital converter 430. Analog to digital converter 430 converts the filtered analog signal from continuous time filter 422 to produce a sequence of digital samples 432. Digital samples 432 correspond to an original data set except that there may be some noise corruption. Analog to digital converter 230 may be any circuit, device or system known in the art that is capable of converting an electrical signal from the analog domain to the digital domain. Based on the disclosure provided herein, one of ordinary skill in the art will recognize a variety of analog to digital converters that may be used in relation to different embodiments of the present invention.

Figure 1A:
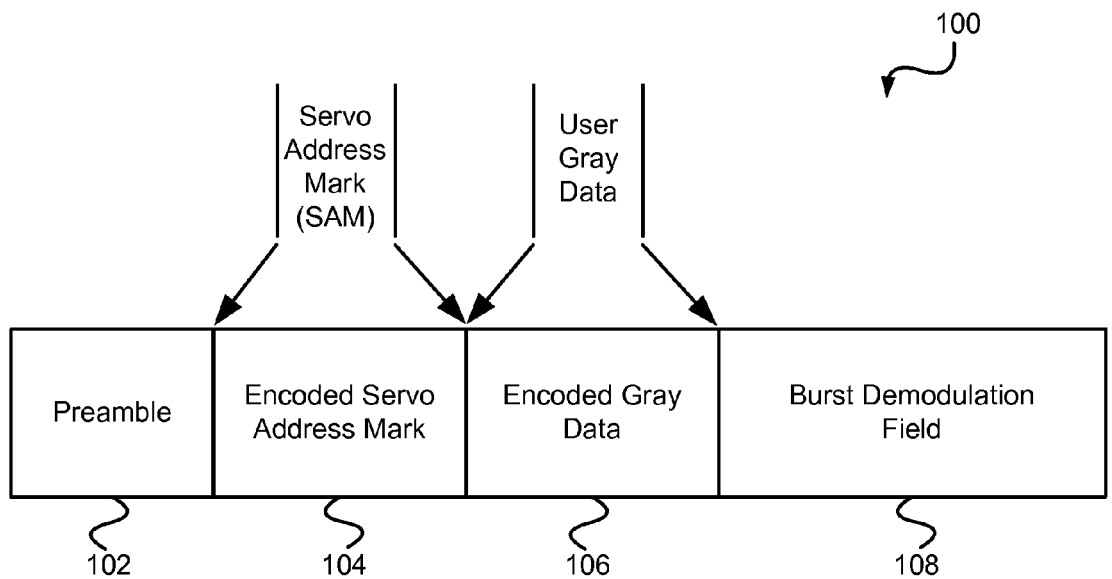
FIGS. 1a-1b depicts an existing radial storage medium and associated servo sector information.
Figure 1B:
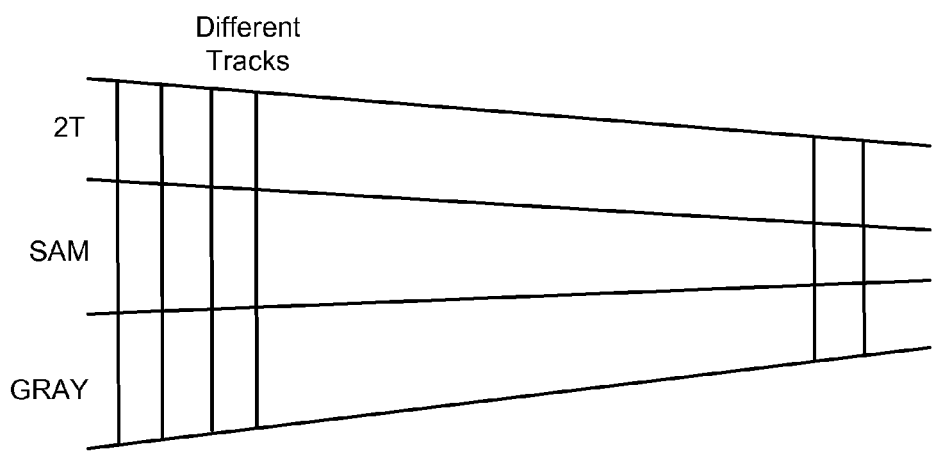
Figure 2:
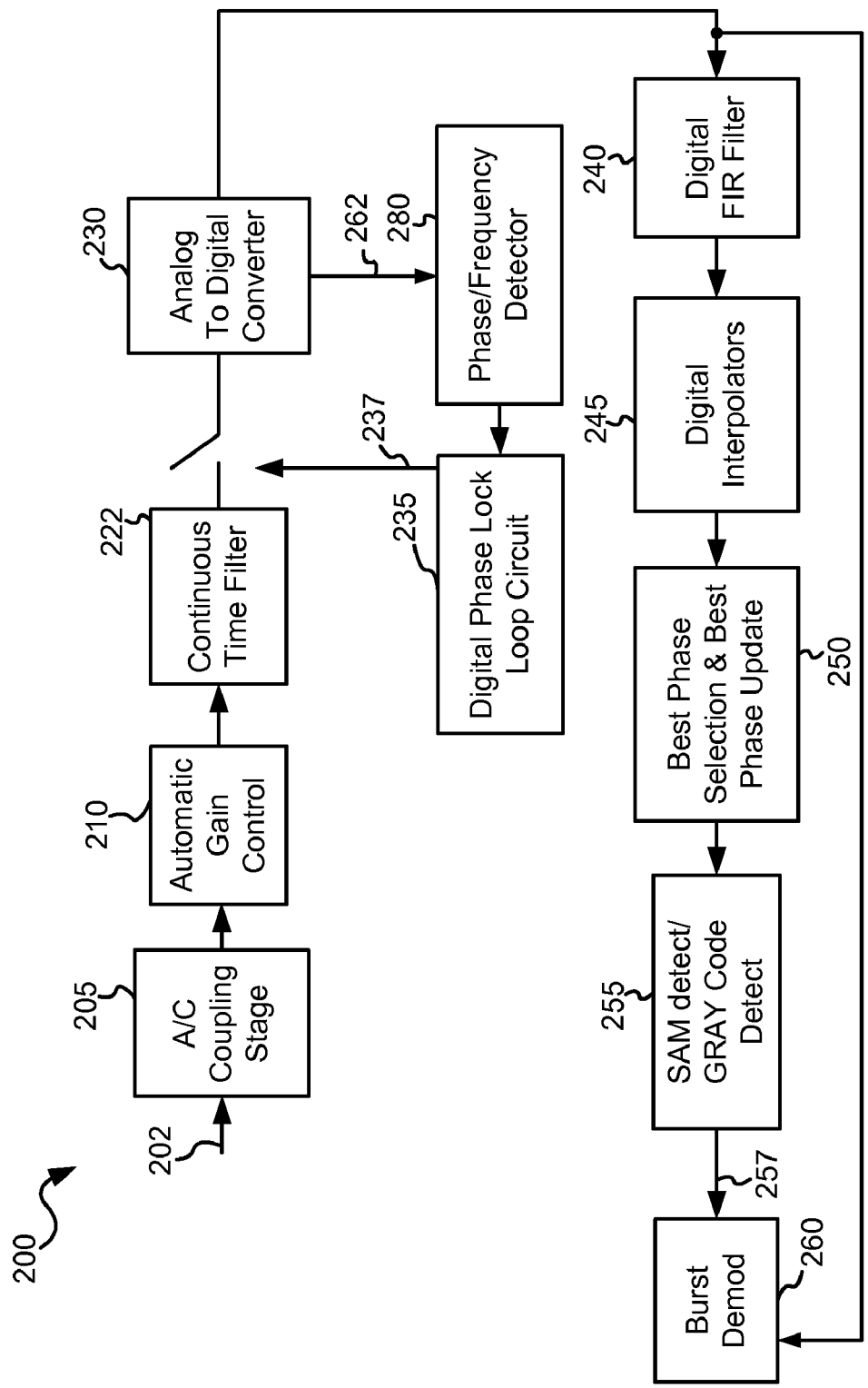
FIG. 2 depicts a prior art burst demodulation system that may be used in relation to a servo system.
Figure 3:
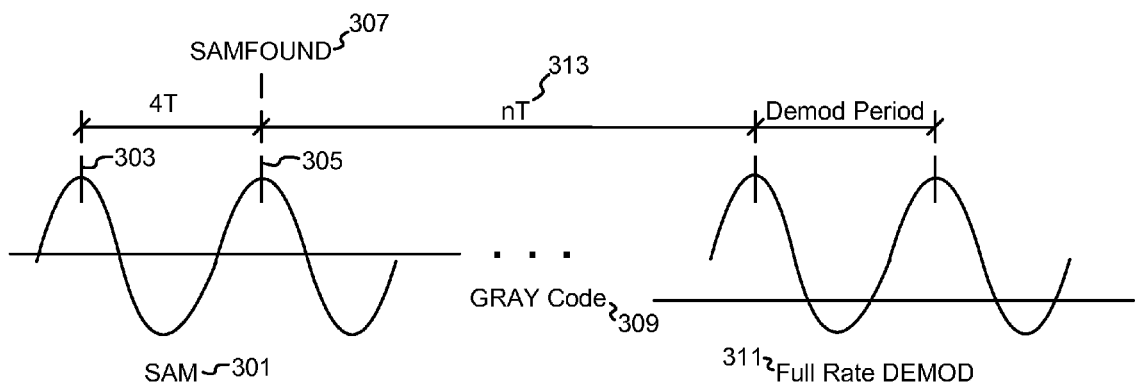
FIG. 3 shows an exemplary operation of the burst demodulation system depicted in FIG. 2 operating on a full rate demodulation.

Samples 432 are provided in series to a phase/frequency detector circuit 485 that provides an error signal 482 indicating any phase and/or frequency error in a clock output 437 that is used to control the sample timing of analog to digital converter 430. Error signal 482 may include both a slope error and phase error that are used as feedback to a digitally controlled clock generator 480. As one example, phase/frequency detector 485 may be similar to that disclosed in U.S. Pat. No. 6,856,183 entitled "Scheme to Improve Performance of Timing Recovery Systems for Read Channels in a Disk Drive" and filed by Annampedu on Oct. 12, 2001. The entirety of the aforementioned patent is incorporated herein by reference for all purposes. As discussed therein, the phase/frequency detector circuit may include a slope look-up table (not shown) that is used to generate a slope output that is part of error signal 482. Further, as discussed therein, the circuit compares the preliminary decisions from a detector (e.g., a Viterbi detector) and the raw output from analog to digital converter 430. The aforementioned slope output and phase error may be combined into error signal 482 in a manner similar to that described in relation to FIG. 2 of U.S. patent application Ser. No. 11/841,033 entitled "Systems and Methods for Improved Timing Recovery", and filed by Annampedu on Aug. 20, 2007. The entirety of the aforementioned patent application is incorporated herein by reference for all purposes. Based upon the disclosure provided herein, one of ordinary skill in the art will recognize other implementations of phase/frequency detector circuits that may be used in relation to different embodiments of the present invention.

Digitally controlled clock generator 480 adjusts the frequency of clock output 437 based on error output 482 from phase/frequency detector circuit 485. Further, digitally controlled clock generator 480 is capable of implementing a clock skew or phase shift that may be slowly incorporated into clock output 437 beginning from the detection of the SAM. This slewed clock skew or phase shift may be implemented via a phase offset value 475 that is provided to a digital phase lock loop circuit 465. Phase offset value 475 is a known value obtained from a phase adjust register 465, but that is ramped up slowly according to an algorithm implemented by a phase skew circuit 470. The ramping process limits the amount of oscillation induced in digital phase lock loop circuit 465 due to the change. The process of ramping (i.e., slewing) phase offset value 475 is started when a SAM found output signal 457 is asserted. As will be appreciated from the disclosure provided herein, digitally controlled clock generator 480 is a decision directed loop that is operated based on input data stream and/or earlier decisions made in relation to the data stream to avoid latency in obtaining updated sample times. A more detailed diagram of digitally controlled clock generator 480 is discussed below in relation to FIG. 5b. It should be noted that alternatives to digitally controlled clock generator 480 may be used in relation to different embodiments of the present invention to provide clock synthesis and clock skewing. Based on the disclosure provided herein, one of ordinary skill in the art will recognize a variety of clock generator circuits capable of phase shifting and/or slew limited phase shifting that may be used.

Samples 432 are also provided in series to a digital FIR filter 440 and to one or more digital interpolators 445. Digital interpolators 445 are operable to identify an incoming preamble signal and to determine the optimal phase/frequency for sampling the preamble. In particular, a best phase selection and phase update circuit 450 processes the preamble and develops periodic boundaries (T) defining the sampling times that are used in processing a subsequent SAM pattern and GRAY code pattern using a SAM detect and GRAY code detect circuit 455 to, among other things, identify the SAM incorporated in input signal 402. SAM detect and GRAY code detect circuit 455 provides SAM found output signal 457 indicating that the SAM has been identified. A burst demod circuit 460 processes samples 432 beginning sometime after SAM found output signal 457 is asserted. In particular, burst demod circuit 460 performs burst demodulation beginning an integer multiple of the previously determined periodic boundaries (T) plus a clock skew factor corresponding to phase offset value 475 (i.e., nT+Skew).

Thus, in contrast to existing systems, the aforementioned embodiments of the present invention provides fractional phase compensation by slowly modifying the phase of the sample clock by a certain amount after SAM is found. In this way, modified rate burst demodulation information may be performed in much the same way that full rate demodulation is currently performed. The phase adjustment amount (i.e., the value written to phase adjust register 465) to be slewed over GRAY code region can be pre-computed or hard-coded after the analog front-end setup is fixed. Alternatively, the phase adjustment amount (i.e., the value written to phase adjust register 465) to be slewed over GRAY code region may be automatically generated during a calibration operation. Such automatic generation allows for optimizing the channel for a particular modified rate burst demodulation, such as, for example, a half rate burst demodulation. Using a reasonably robust asynchronous detector, a slow variation in timing over SAM and GRAY code fields does not compromise the SAM and GRAY code detection performance.

It should be noted that among other advantages, various embodiments of the present invention may be implemented through only minimal changes to an existing read channel architecture. As another advantage, some embodiments of the present invention provide a general ability to match phases between any two signals with arbitrary frequencies—not necessarily at half rate frequency. Furthermore, the idea can help to compensate for phase mismatches outside of a particular read channel device, such as those introduced by non-linear preamplifiers.

Figure 5B:
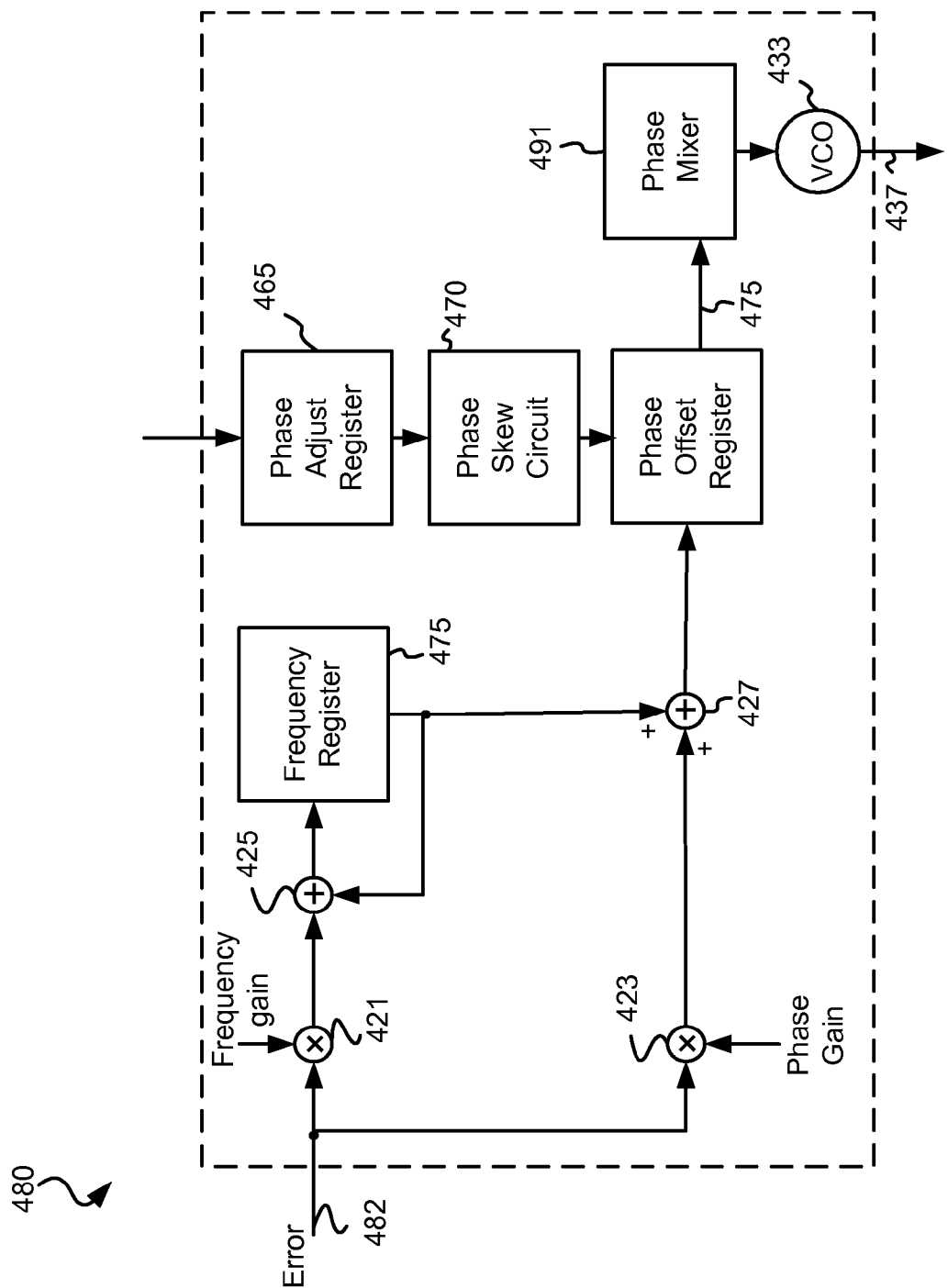

Turning to FIG. 5b, digitally controlled clock generator 480 is discussed in further detail. As shown, digitally controlled clock generator 480 receives error signal 482 along with a defined phase gain and frequency gain input. Again, in some cases, error signal 482 includes both error and slope information. A multiplier 421 receives error signal 482 and a frequency gain and provides the product thereof to a summation element 425. Further, a multiplier 423 receives error signal 482 and a phase gain and provides the product thereof to a summation element 427. Summation element 425 adds the product of multiplier 421 to a value maintained in a frequency register 475, and provides the result back to frequency register 475 to perform an integration function. The value in frequency register 475 is provided to summation element 427 along with the product of multiplier 423. The product of summation element 427 is provided to a phase offset register 475 that holds a phase offset value in part controlled by phase skew circuit 470. Of note, phase skew circuit 470 causes the value in phase offset register 475 to slowly adjust to a value offset by a skew amount maintained in phase adjust register 465. The value in phase offset register 475 is provided to a phase mixer circuit 491 which drives a voltage controlled oscillator 433. Based on this input, voltage controlled oscillator generates clock output 437. Of note, digitally controlled clock generator 480 is a decision directed loop that is operated based on input data stream and/or earlier decisions made in relation to the data stream to avoid latency in obtaining updated sample times. Again, it should be noted that digitally controlled clock generator 480 is only one implementation that may be used in relation to the various embodiments of the present invention, and that based on the disclosure provided herein, one of ordinary skill in the art will recognize other clock synthesizers or other circuits include slew rate controlled phase skew adjustment capabilities that allow for implementation of different embodiments of the present invention.

Figure 6:
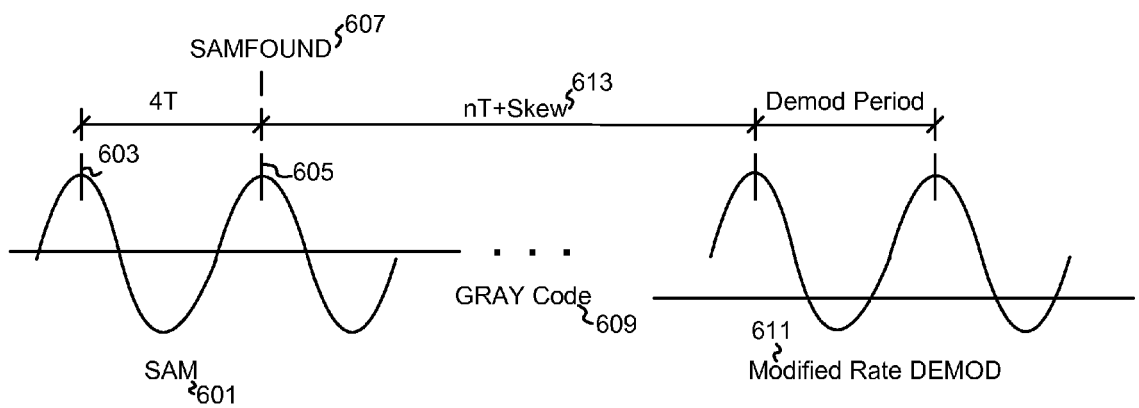
FIG. 6 shows an exemplary operation of the burst demodulation system depicted in FIG. 5 operating on a modified rate demodulation.

Turning to FIG. 6, an exemplary operation of skew adjusted burst demodulation system 400 is depicted in accordance with various embodiments of the present invention. Following the diagram, sampling is performed to identify a SAM pattern 601 as indicated by vertical lines 603, 605 separated by four periodic boundaries (i.e., 4T). A SAM found output 607 is asserted coincident with sample 605. An intervening GRAY code 609 is decoded using a clock that is being adjusted to add the skew needed for burst demodulation processing. Following processing of GRAY code information, detection of a modified rate burst demodulation pattern 611 is performed. Of note, by the time burst rate demodulation begins, the clock has been phase shifted by an amount designated "skew" on the diagram. Modified burst rate demodulation 611 aligns with an integer (n) multiplication of the periodic boundaries (T) plus "skew" (i.e., nT+Skew 613) from SAM found output 607. This provides a substantial increase in signal to noise ratio when compared with the scenario discussed above in relation to FIG. 4.

Figure 7:
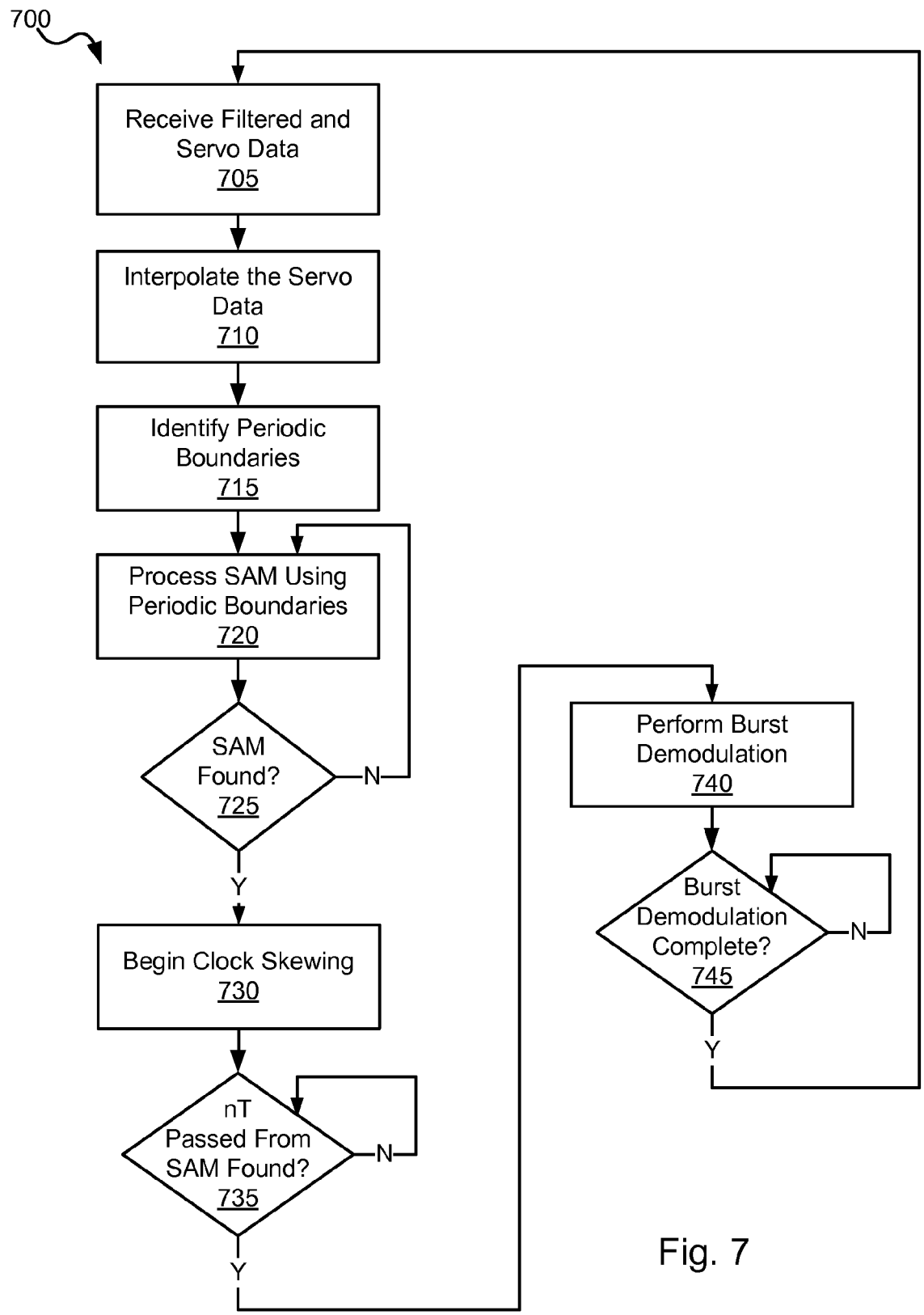
FIG. 7 is a flow diagram depicting a method in accordance with various embodiments of the present invention for performing burst demodulation.

Turning to FIG. 7, a flow diagram 700 depicts a method in accordance with various embodiments of the present invention for performing burst demodulation. Following flow diagram 700, filtered servo data is received (block 705). The received servo data is interpolated (block 710) and optimal periodic boundaries (T) are identified (block 715). The servo data is processed including the SAM data pattern therein using the identified periodic boundaries (block 720). This process of SAM identification continues until the SAM found signal is asserted indicating that SAM processing has completed (block 725). At this point, processing of the succeeding GRAY code pattern is accomplished while at the same time the sampling clock is purposely skewed (block 730). The sampling clock is skewed such that the sampling times are slowly phase shifted away from the periodic boundaries that were used during the preceding SAM processing. The slew rate at which the sampling clock is phase shifted is designed such that it allows for accepting and identifying the GRAY code pattern, but is shifted a desired skew amount before the subsequent burst demodulation process begins. In particular, this process of phase shifting the sampling clock is done before a defined integer number (n) of the previously determined periodic boundaries have passed since the SAM found signal was asserted (block 735). Once the defined integer number of periodic boundaries has passed (block 735), the process of burst demodulation is performed (block 740). Because of the clock skewing, the sampling clock used during burst demodulation is the integral number of periodic boundaries (nT) plus a skew factor. This continues until burst demodulation completes (block 745). Again, the skew factor may be preprogrammed into a register, or may be automatically calibrated through a process of identifying an optimal sampling point within the burst demodulation pattern, and determining the distance from the preceding SAM found point.

In conclusion, the invention provides novel systems, devices, methods and arrangements for performing modified rate burst demodulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for performing modified rate burst demodulation in a servo system, the method comprising:
   receiving a data input, wherein the data input includes a synchronization pattern, an information pattern, and a demodulation pattern;
   establishing a periodic boundary based at least in part on the synchronization pattern, wherein a phase of a sampling clock used to receive the data input at least indirectly corresponds to the periodic boundary;
   processing the information pattern using the sampling clock, wherein a location fix is established;
   phase shifting the sampling clock by a skew amount, wherein the skew amount corresponds to a defined offset between the synchronization pattern and the demodulation pattern, and wherein a phase shifted sampling clock is provided; and
   processing the demodulation pattern using the phase shifted sampling clock.

2. The method of claim 1, wherein the data input includes servo data, wherein the synchronization pattern includes a preamble pattern of the servo data, wherein the information pattern includes both a servo address mark pattern and a GRAY code pattern of the servo data, and wherein the demodulation pattern is a modified rate burst demodulation pattern of the servo data.

3. The method of claim 2, wherein the modified rate burst demodulation pattern is a half rate burst demodulation pattern.

4. The method of claim 2, wherein the location fix corresponds to the finding of the servo address mark within the servo data.

5. The method of claim 4, wherein the phase shift by the skew amount is slowly implemented over the course of processing the GRAY code pattern.

6. The method of claim 5, wherein the skew amount is only partially implemented during processing of early portions of the GRAY code pattern, and wherein the skew amount is fully implemented during processing of the final portions of the GRAY code pattern.

7. The method of claim 5, wherein the skew amount is fully implemented during processing of the modified rate burst demodulation pattern.

8. The method of claim 1, wherein the periodic boundary recurs at an integer multiple of a symbol rate.

9. The method of claim 8, wherein the demodulation pattern is processed an integer number of periodic boundaries plus the skew amount after the location fix.

10. The method of claim 1, wherein the skew amount is user programmable.

11. The method of claim 1, wherein the skew amount is automatically determined.

12. A servo system, the system comprising: an analog data input, wherein the analog data input includes a synchronization pattern, an information pattern, and a demodulation pattern;
   an analog to digital converter, wherein the analog to digital converter utilizes a sampling clock to provide a digital data input corresponding to the analog data input;
   a synchronization pattern processing circuit, wherein the synchronization pattern processing circuit receives at least a portion of the digital data input and is operable to establish a periodic boundary, and wherein a phase of the sampling clock at least indirectly corresponds to the established periodic boundary;
   an information pattern processing circuit operable to establish a position fix using the sampling clock;
   a clock generation circuit, wherein the clock generation circuit is operable to provide the sampling clock, and wherein the clock generation circuit is operable to phase shift the sampling clock by a skew amount to provide a phase shifted sampling clock, and wherein the skew amount corresponds to a defined offset between the synchronization pattern and the demodulation pattern; and
   a demodulation processing circuit operable to perform demodulation processing of the demodulation pattern using the phase shifted sampling clock.

13. The system of claim 12, wherein the periodic boundary recurs at a symbol rate, and wherein the demodulation pattern is processed an integer number of periodic boundaries plus the skew amount after the position fix.

14. The system of claim 12, wherein the skew amount is selected from a group consisting of: a user programmable value, and an automatically determined value.

15. The system of claim 12, wherein the analog data input includes servo data, wherein the synchronization pattern includes a preamble pattern of the servo data, wherein the information pattern includes both a servo address mark pattern and a GRAY code pattern of the servo data, and wherein the demodulation pattern is a modified rate burst demodulation pattern of the servo data.

16. The system of claim 15, wherein the modified rate burst demodulation pattern is a half rate burst demodulation pattern.

17. The system of claim 15, wherein the location fix corresponds to the finding of the servo address mark within the servo address mark pattern.

18. The system of claim 17, wherein the phase shift by the skew amount is slowly implemented over the course of processing the GRAY code pattern.

19. A hard disk drive system, the system comprising:
a magnetic storage medium;
a read channel device, wherein the read channel device includes a servo data processing circuit, wherein the servo data processing circuit includes:
an analog data input derived from the magnetic storage medium, wherein the analog data input includes servo data, and wherein the servo data includes a preamble pattern, a servo address mark pattern, a GRAY code pattern, and a burst rate demodulation pattern;
an analog to digital converter, wherein the analog to digital converter utilizes a sampling clock to provide a digital data input corresponding to the analog data input;
a preamble pattern processing circuit that receives at least the preamble pattern portion of the digital data input and is operable to establish a periodic boundary, and wherein a phase of the sampling clock at least indirectly corresponds to the established periodic boundary;
a servo address mark processing circuit operable to identify a servo address mark found position using the sampling clock;
a clock generation circuit operable to provide the sampling clock, and wherein the clock generation circuit is operable to phase shift the sampling clock by a skew amount to provide a phase shifted sampling clock is provided, and wherein the skew amount corresponds to a defined offset between the synchronization pattern and the demodulation pattern; and
a burst mode demodulation processing circuit operable to perform modified rate burst mode demodulation processing of the burst rate demodulation pattern.

20. The system of claim 19, wherein the phase shift by the skew amount is slowly implemented over the course of processing the GRAY code pattern.

* * * * *